US008799773B2

(12) United States Patent
Reis et al.

(10) Patent No.: US 8,799,773 B2
(45) Date of Patent: Aug. 5, 2014

(54) ASPECT-BASED SENTIMENT SUMMARIZATION

(75) Inventors: George Reis, Robbinsville, NJ (US); Sasha Blair-Goldensohn, New York, NY (US); Ryan T. McDonald, New York, NY (US)

(73) Assignee: Google Inc., Mountain View, CA (US)

( * ) Notice: Subject to any disclaimer, the term of this patent is extended or adjusted under 35 U.S.C. 154(b) by 943 days.

(21) Appl. No.: 12/051,798

(22) Filed: Mar. 19, 2008

(65) Prior Publication Data

US 2009/0193328 A1 Jul. 30, 2009

Related U.S. Application Data

(60) Provisional application No. 61/023,760, filed on Jan. 25, 2008.

(51) Int. Cl.
*G06F 17/27* (2006.01)
*G06N 5/02* (2006.01)

(52) U.S. Cl.
CPC ..................................... *G06N 5/025* (2013.01)
USPC ............... 715/254; 715/255; 715/256; 704/9; 707/730; 707/750; 705/26.7; 705/7.29; 706/46

(58) Field of Classification Search
CPC ..................................................... G06N 5/025
USPC .................. 715/255–256, 200, 772, 821, 254
See application file for complete search history.

(56) References Cited

U.S. PATENT DOCUMENTS

| 5,832,504 | A | 11/1998 | Tripathi et al. |
|---|---|---|---|
| 6,226,659 | B1 | 5/2001 | Wong et al. |
| 6,611,838 | B1 | 8/2003 | Ignat et al. |
| 6,892,179 | B1 | 5/2005 | Zacharia |
| 7,139,766 | B2 | 11/2006 | Thomson et al. |
| 7,315,848 | B2 | 1/2008 | Pearse et al. |
| 7,356,758 | B1 | 4/2008 | Bedell et al. |
| 7,523,085 | B2 | 4/2009 | Nigam et al. |
| 7,558,769 | B2 | 7/2009 | Scott et al. |
| 7,624,093 | B2 | 11/2009 | Fortuna |
| 7,685,091 | B2 | 3/2010 | Boone et al. |
| 7,720,835 | B2 | 5/2010 | Ward et al. |
| 7,756,879 | B2 | 7/2010 | Parsons et al. |
| 7,865,354 | B2 | 1/2011 | Chitrapura et al. |

(Continued)

OTHER PUBLICATIONS

Sentiment Analyzer: Extracting Sentiments about a Given Topic using Natural Language Processing Techniques, by Yi et al., published 2003 IEEE.*

(Continued)

*Primary Examiner* — William Bashore
*Assistant Examiner* — Nathan Shrewsbury
(74) *Attorney, Agent, or Firm* — Middleton Reutlinger (57) ABSTRACT

Phrases in the reviews that express sentiment about a particular aspect are identified. Reviewable aspects of the entity are also identified. The reviewable aspects include static aspects that are specific to particular types of entities and dynamic aspects that are extracted from the reviews of a specific entity instance. The sentiment phrases are associated with the reviewable aspects to which the phrases pertain. The sentiment expressed by the phrases associated with each aspect is summarized, thereby producing a summary of sentiment associated with each reviewable aspect of the entity. The summarized sentiment and associated phrases can be stored and displayed to a user as a summary description of the entity.

24 Claims, 8 Drawing Sheets

(56) References Cited

U.S. PATENT DOCUMENTS

| | | | |
|---|---|---|---|
| 7,949,937 | B2 | 5/2011 | Wu |
| 7,996,210 | B2 | 8/2011 | Godbole et al. |
| 2003/0004742 | A1 | 1/2003 | Palmer et al. |
| 2006/0026122 | A1 | 2/2006 | Hurwood et al. |
| 2006/0048048 | A1 | 3/2006 | Welcker et al. |
| 2006/0069589 | A1 | 3/2006 | Nigam et al. |
| 2006/0242040 | A1 | 10/2006 | Rader |
| 2007/0016580 | A1 | 1/2007 | Mann et al. |
| 2007/0027672 | A1 | 2/2007 | Decary et al. |
| 2007/0078671 | A1 | 4/2007 | Dave et al. |
| 2007/0078833 | A1 | 4/2007 | Chea et al. |
| 2007/0143176 | A1 | 6/2007 | Nong et al. |
| 2007/0165904 | A1 | 7/2007 | Nudd et al. |
| 2007/0174343 | A1 | 7/2007 | Fortuna |
| 2007/0226204 | A1 | 9/2007 | Feldman |
| 2007/0266025 | A1 | 11/2007 | Wagner et al. |
| 2008/0005051 | A1 | 1/2008 | Turner et al. |
| 2008/0103877 | A1* | 5/2008 | Gerken .......................... 705/10 |
| 2008/0133488 | A1 | 6/2008 | Bandaru et al. |
| 2008/0154883 | A1 | 6/2008 | Chowdhury et al. |
| 2008/0215571 | A1 | 9/2008 | Huang et al. |
| 2008/0249764 | A1 | 10/2008 | Huang et al. |
| 2008/0288481 | A1 | 11/2008 | Zeng et al. |
| 2009/0048823 | A1 | 2/2009 | Liu et al. |
| 2009/0112892 | A1* | 4/2009 | Cardie et al. .................. 707/100 |
| 2009/0193011 | A1* | 7/2009 | Blair-Goldensohn et al. .... 707/5 |
| 2009/0193328 | A1 | 7/2009 | Reis et al. |
| 2009/0248399 | A1 | 10/2009 | Au |
| 2009/0319342 | A1 | 12/2009 | Shilman et al. |
| 2009/0319518 | A1 | 12/2009 | Koudas et al. |

OTHER PUBLICATIONS

Gindl, S., et al., "Generic High-Throughput Methods for Multilingual Sentiment Detection," 4th IEEE International Conference on Digital Ecosystems and Technologies, Apr. 12, 2010, 6 Pages, Dubai, United Arab Emirates.
Melville, P., et al., "Sentiment Analysis of Blogs by Combining Lexical Knowledge with Text Classification," KDD'09, Jun. 28-Jul. 1, 2009, pp. 1275-1283.
Na, J.C., et al., "A Sentiment-Based Meta Search Engine," Proceedings of the Asia-Pacific Conference on Library & Information Education & Practice, Apr. 3-6, 2006, pp. 83-89.
Na, J.C., et al., "Sentiment-Based Search in Digital Libraries," JCDL'05, Jun. 7-11, 2005, pp. 143-144.
Pang, B., "Automatic Analysis of Document Sentiment," A Dissertation Presented to the Faculty of the Graduate School of Cornell University in Partial Fulfillment of the Requirements for the Degree of Doctor of Philosophy, Aug. 2006, 138 Pages.
Philip Beineke et al., *An Exploration of sentiment summarization*, Proceedings of the AAAI Spring Symposium on Exploring Attitude and Affect in Text: Theories and Applications, 2004, 3 pages.
Giuseppe Carenini et al., *Multi-Document Summarization of Evaluative Text*, 11$^{th}$ Conference of the European Chapter of the Association for Computational Linguistics, Apr. 3-7, 2006, pp. 305-312.
Giuseppe Carenini et al., *Extracting Knowledge from Evaluative Text*, Proceedings of the Third International Conference on Knowledge Capture, Oct. 2-5, 2005, pp. 11-18, ACM Press.
Yejin Choi et al., *Identifying Sources of Opinions with Conditional Random Fields and Extraction Patterns*, Human Language Technology Conference and Conference on Empirical Methods in Natural Language Processing, Oct. 6-8, 2005, pp. 355-362.
John Blitzer et al., *Biographies, Bollywood, Boom-boxes and Blenders: Domain Adaptation for Sentiment Classification*, Proceedings of the 45$^{th}$ Annual Meeting of the Association for Computational Linguistics, Jun. 23-30, 2007, pp. 440-447.
Michael Gamon et al., *Pulse: Mining Customer Opinions from Free Text*, Advances in Intelligent Data Analysis VI, 6$^{th}$ International Symposium on Intelligent Data Analysis, IDA 2005, Sep. 8-10, 2005, pp. 121-132.

Minqing Hu et al., *Mining and Summarizing Customer Reviews*, Proceedings of the Tenth ACM SIGKDD International Conference on Knowledge Discovery and Data Mining, Aug. 22-25, 2004, pp. 168-177.
Minqing Hu et al., *Mining Opinion Features in Customer Reviews*, Proceedings of the Nineteenth National Conference on Artificial Intelligence (AAAI-04), 2004, pp. 755-760.
Yi Mao et al., *Isotonic Conditional Random Fields and Local Sentiment Flow*, Proceedings of the 20$^{th}$ Annual Conference on Neural Information Processing Systems, Dec. 4-7, 2006, pp. 961-968.
Ryan McDonald et al., *Structured Models for Fine-to-Coarse Sentiment Analysis*, Proceedings of the 45$^{th}$ Annual Meeting of the Association for Computational Linguistics, Jun. 23-30, 2007, pp. 432-439.
George A. Miller, *WordNet: A Lexical Database for English*, Communications of the ACM, Nov. 1995, pp. 39-41, vol. 38, No. 11.
Bo Pang et al., *Thumbs up? Sentiment Classification using Machine Learning Techniques*, Proceedings of the 2002 Conference on Empirical Methods in Natural Language Processing, Jul. 6-7, 2002, pp. 79-86.
Ana-Maria Popescu et al., *OPINE: Extracting Product Features and Opinions from Reviews*, Human Language Technology Conference and Conference on Empirical Methods in Natural Language Processing, Oct. 6-8, 2005, pp. 32-33.
Benjamin Snyder et al., *Multiple Aspect Ranking using the Good Grief Algorithm*, Human Language Technologies 2007: The Conference of the North American Chapter of the Association for Computational Linguistics, Apr. 22-27, 2007, pp. 300-3007.
Peter D. Turney, *Thumps up or Thumbs down? Semantic Orientation Applied to Unsupervised Classification of Reviews*, Proceedings of the 40$^{th}$ Annual Meeting of the Association for Computational Linguistics (ACL), Jul. 2002, pp. 417-424.
Janyce M. Wiebe, *Learning Subjective Adjectives from Corpora*, Proceedings of the Seventeenth National Conference on Artificial Intelligence (AAAI-2000), 2000, pp. 735-740.
Li Zhuang et al., *Movie Review Mining and Summarization*, ACM 15$^{th}$ Conference on Information and Knowledge Management, Nov. 6-11, 2006, pp. 43-50.
PCT International Search Report and Written Opinion, PCT/US2009/031901, Mar. 3, 2009, 8 Pages.
PCT International Search Report and Written Opinion, PCT/US2009/032061, Mar. 27, 2009, 9 Pages.
Lui, "Opinion Observer: analyzing and comparing opinions on the Web," Proceedings of the 14$^{th}$ International Conference on World Wide Web, May 10-14, 2005, ACM, pp. 342-351.
Aue, A., et al., "Customizing Sentiment Classifiers to New Domains: a Case Study," Submitted to RANLP-05, the International Conference on Recent Advances in Natural Language Processing, 2005, 6 pages.
Hu, M., et al., "Mining and Summarizing Customer Reviews," Proceedings of the tenthACM SIGKDD international conference on Knowledge discovery and data mining, 2004, 10 pages.
Kamps, J., et al., "Using WordNet to Measure Semantic Orientations of Adjectives," Proceedings of the 4th International Conference on Language Resources and Evaluation LREC04, 2004, 4 pages.
Tan, S., et al., "A Novel Scheme for Domain-transfer Problem in the context of Sentiment Analysis," Proceedings of the sixteenth ACM conference on Conference on information and knowledge management, 2007, pp. 979-982.
Tang, H., et al., "A survey on sentiment detection of reviews," Expert Systems with Applications, vol. 36, Issue 7, Sep. 2009, pp. 10760-10773.
Dave, K., et al. "Mining the Peanut Gallery: Opinion Extraction and Semantic Classification of Product Review" WWW, May 20-24, 2003, pp. 519-528.
Esuli, A., et al. "PageRanking WordNet Synsets: An Application to Opinion Mining" Proceedings of the 45$^{th}$ Annual Meeting of the Association of Computational Linguistics, Jun. 2007, pp. 424-431.
Hurst, M., et al. "Retrieving Topical Sentiments from Online Document Collections" 2004, 8 pages.
Kanayama, et al. "Fully Automatic Lexicon Expansion for Domain-oriented Sentiment Analysis" Jul. 2006, pp. 355-363, Proceedings of (56) References Cited

OTHER PUBLICATIONS the 2006 Conference on Empirical Methods in Natural Language Processing (EMNLP 2006), Sydney.

Kim, S-M., et al. "Identifying and Analyzing Judgment Opinions" Proceedings of the Human Language Technology Conference of the North American Chapter of the ACI, 2006, pp. 200-207.

Shi, et al., "Mining Chinese Reviews," Data Mining Workshops, 2006, ICDM Workshops 2006. Sixth IEEE, PI, ISBN: 978-0-7695-2702-4.

Balog, K. et al, "Why are they excited? Identifying and Explaining Spikes in Blog Mood Levels," Proceeding EACL '06 Proceedings of the Eleventh Conference of the European Chapter of the Association for Computational Linguistics: Posters & Demonstrations, 2006, 4 pages, ISLA, University of Amsterdam, Netherlands.

"MPQA Releases—Corpus and Opinion Recognition System," 2 pages, [Archived on web.archive.com on Dec. 6, 2007] [online] [Retrieved on Nov. 12, 2010] Retrieved from the Internet <URL:http://web.archive.org/web/20071206160223/http://www.cs.pitt.edu/mpqa/>.

Kim, S.-M., et al, "Determining the Sentiment of Opinions," Proceedings of the COLING Conference, 2004, pp. 1-8, Geneva.

Koppel, M. et al., "Good News or Bad News? Let the Market Decide," Dept. of Computer Science, 2006, 5 pages, Bar-Ilan University, Ramat-Gan, Israel.

Lee, L., "A Matter of Opinion: Sentiment Analysis and Business Intelligence (position paper)," Presented at the IBM Faculty Summit on the Architecture of On-Demand Business, May 17-18, 2004, 2 pages, Cornell University.

Mishne, G. et al., "MoodViews: Tools for Blog Mood Analysis," American Associate for Artificial Intelligence, 2006, 2 pages, ISLA, University of Amsterdam, Netherlands.

"Moodgrapher," MoodViews: Tools for Blog Mood Analysis, 2005, 1 page, [Archived on web.archive.com on Dec. 14, 2007] [online] [Retrieved on Nov. 12, 2010] Retrieved from the Internet <URL:http://web.archive.org/web/20071214004346/http://www.moodviews.com/Moodgrapher/>.

Nasukawa, T. et al., "Sentiment Analysis: Capturing Favorability Using Natural Language Processing," Proceedings of the $2^{nd}$ International Conference on Knowledge Capture, 2003, pp. 70-77, Sanibel Island, FL, USA.

Nielsen Buzzmetrics: The Global Measurement Standard in Consumer-Generated Media, BuzzMetrics, 2007, 1 page, [Archived on web.archive.com on Dec. 10, 2007] [online] [Retrieved on Nov. 12, 2010] Retrieved from the Internet <URL:http://web.archive.org/web/20071210041849/http://www.nielsenbuzzmetrics.com/>.

Opinmind.com, 1 page [Archived on web.archive.com on Dec. 23, 2007] [online] [Retrieved on Nov. 12, 2010] Retrieved from the Internet <URL:http://web.archive.org/web/20071223003722/http://www.opinmind.com/>.

Pang, B. et al, "A Sentimental Education: Sentiment Analysis Using Subjectivity Summarization Based on Minimum Cuts," ACL '04 Proceedings of the 42nd Annual Meeting on Association for Computational Linguistics, 2004, 8 pages, Dept. of Computer Science, Cornell University, Ithaca, NY.

Popescu, A. et al., "OPINE: Mining Product Reviews," 1 page, [Archived on web.archive.com on Jan. 14, 2008] [online] [Retrieved on Nov. 12, 2010] Retrieved from the Internet <URL:http://web.archive.org/web/20080114065434/http:///www.cs.washington.edu/research/knowitall/opine/>.

Rottentomatoes.com, 1998, 2 pages, [Archived on web.archive.com on Dec. 5, 2007] [online] [Retrieved on Nov. 12, 2010] Retrieved from the Internet <URL:http://web.archive.org/web/20071205114734/http://www.rottentomatoes.com/>.

Textmap.com, "The entity search engine," 1 page, 2007, [Archived on web.archive.com on Dec. 27, 2007] [online] [Retrieved on Nov. 12, 2010] Retrieved from the Internet <URL:http://web.archive.org/web/20071227081734/http://textmap.com/>.

* cited by examiner

Enoteca Pizza

★★★★☆ 355 reviews - Write a review

New York, NY 10003

[map image] View Larger Map — 712

Overview | Details (8) | Reviews (355) | Photos (7) | Web Pages (610)  — 714 pizza ★★★★☆ — EXCELLENT thin crust pizza...pizzas were good...pizza is really not good...pizza is good...just not very pretty bad...Pizzas were simple...mediocre pizza...

wine ★★★★☆ — great crisp wines...wine were very good...wine selection was great...Healthy wine...wine list is superb... outstanding...excellent wine list...lovely wine connoisseurs...

food ★★★★☆ — food is good...food is always fresh...mediocre food...great food...food iS worthy...They serve real italian food...food is unbelievable...unimpressive food...  — 728 service ★★★★☆ — Service was quite good...service is bad...service was poor...truly awful service...service was acceptable... even worse...service was decent...important service...

experience ★★★★☆ — it was a good experience...bad experience...Had an awful experience...expecting a great experience... experience...whole experience...truly authentic italian pizza experience...

gelato ★★★★☆ — gelato was really good...hazelnut gelato was superb...gelato was great...best gelato...chocolate gelato was awesome...olive oil gelato...

place ★★★★☆ — would be a good place...great place...place is very nice...wrong place...place is very warm...trendy place...

crust ★★★★★ — EXCELLENT thin crust pizza...traditional small European thin crust...thin crust...VERY TASTY crust...

part ★★★★★ — best part...

restaurant ★★★★☆ — right restaurant...great restaurant...full restaurant...restaurant is cozy...fabulous restaurant...love the NY 716 — pizza
722 — wine
726 — food
724
710

ASPECT-BASED SENTIMENT SUMMARIZATION

CROSS-REFERENCE TO RELATED APPLICATIONS

This application claims the benefit of U.S. Provisional Application No. 61/023,760, filed Jan. 25, 2008, which is incorporated herein by reference. This application is related to U.S. application Ser. No. 11/844,222, filed Aug. 23, 2007, and U.S. application Ser. No. 12/020,483, filed Jan. 25, 2008, both of which are incorporated herein by reference.

BACKGROUND OF THE INVENTION

1. Field of the Invention

This invention pertains in general to natural language processing and in particular to summarizing sentiment about aspects of an entity expressed in reviews and other documents.

2. Description of the Related Art

Online user reviews are increasingly becoming the de-facto standard for measuring the quality of entities such as electronics, restaurants, and hotels. The sheer volume of online reviews makes it difficult for a human to process and extract all meaningful information in order to make an educated decision. While in some cases an average "star rating" for the entity may give a coarse-grained perspective on the opinions about the entity, this average rating may be insufficient information on which to make a decision.

For instance, a given user shopping for a digital music player may be particularly concerned with battery life and sound quality, and less focused on the device's weight or the variety of colors in which it is manufactured. However, as different authors tend to structure their reviews in different ways, it is difficult to identify the prevailing opinions on the specific aspects in which the user is interested, without exhaustively reading the reviews. Similarly, a user seeking opinions on hotel rooms might find an online review site that summarizes the hotel's reviews as three out of five stars. However, the user would not know how the hotel rated on individual aspects, such as service and location, without reading the reviews.

BRIEF SUMMARY OF THE INVENTION

The above and other problems are addressed by a method, computer-readable storage medium, and computer-implemented system for summarizing sentiment expressed by reviews of an entity. An embodiment of the method comprises identifying sentiment phrases in the reviews expressing sentiment about the entity and identifying reviewable aspects of the entity. The method further comprises associating the sentiment phrases with the reviewable aspects of the entity to which the sentiment phrases pertain and summarizing the sentiment expressed by the sentiment phrases associated with the reviewable aspects of the entity. The method stores the summarized sentiment in a data repository.

Embodiments of the computer-readable storage medium and computer-implemented system comprise a sentiment classification module configured to identify sentiment phrases in the reviews expressing sentiment about the entity and an aspect module configured to identify reviewable aspects of the entity. Embodiments further comprise an association module configured to associate the sentiment phrases with the reviewable aspects of the entity to which the sentiment phrases pertain and a summary module configured to summarize the sentiment expressed by the sentiment phrases associated with the reviewable aspects of the entity and to store the summarized sentiment in a data repository.

BRIEF DESCRIPTION OF THE DRAWINGS

FIG. 7 is a screenshot illustrating a display of the selected aspects and sentiment phrases according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

I. Overview

Figure 1:
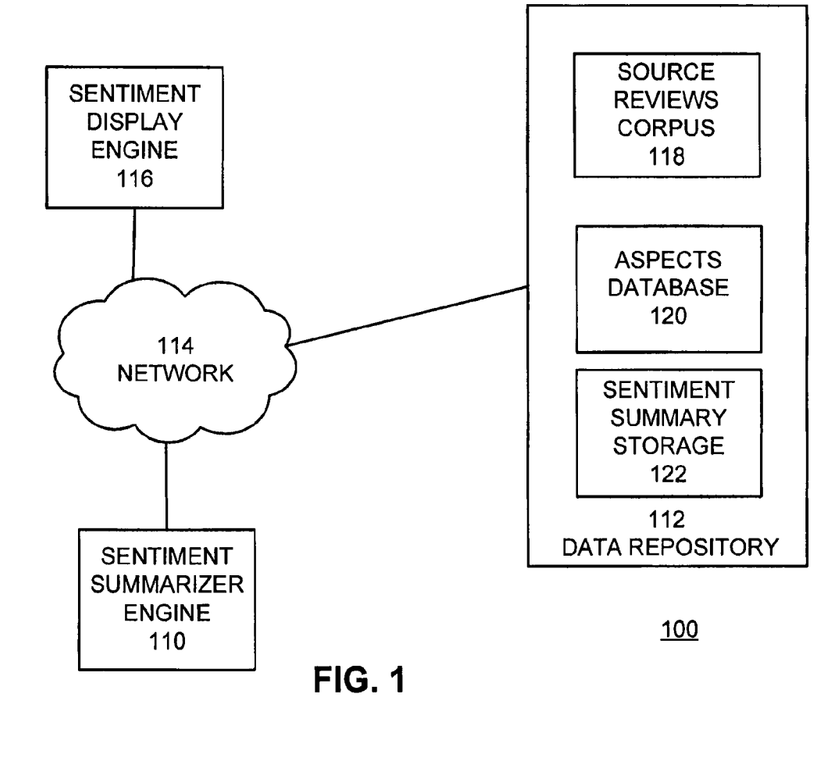
FIG. 1 is a high-level block diagram of a computing environment according to one embodiment.

FIG. 1 is a high-level block diagram of a computing environment 100 according to one embodiment. FIG. 1 illustrates a sentiment summarizing engine (the "sentiment summarizer") 110 and a data repository 112 connected to a network 114. A sentiment display engine 116 is also connected to the network 114. Although FIG. 1 illustrates only a single sentiment summarizer 110, embodiments can have multiple summarizers. Likewise, there can be multiple data repositories and sentiment display engines on the network 114. Only one of each entity is illustrated in order to simplify and clarify the present description. There can be other systems on the network 114 as well. In some embodiments, the functions of the sentiment summarizer 110, sentiment display engine 116, and data repository are combined or rearranged in a different manner than is described here.

The sentiment summarizer 110 provides summaries of sentiment about aspects of entities. An entity is a reviewable object or service. An aspect is a property of the entity that can be evaluated by a user. For example, if the entity is a restaurant the sentiment summarizer 110 can provide summaries of sentiment regarding aspects including the restaurant's food and service. The summary for an aspect can include a rating, e.g. three out of five stars or a letter grade, that concisely summarizes the sentiment. In one embodiment, the summaries are based on source reviews gathered from web sites on the Internet and other locations.

The aspects that are summarized vary for different entities and can be statically and dynamically determined. Static aspects are predefined aspects specific to particular types of entities. For example, the static aspects for a hotel can include location and service. Dynamic aspects, in contrast, are aspects that the sentiment summarizer 110 extracts from the source reviews during the summarization process. For example, the dynamic aspects for a pizzeria can include "pizza," "wine," and "salad."

The data repository 112 stores documents and other data used by the sentiment summarizer 110 to summarize aspects of entities and by the sentiment display engine 116 to provide summaries. In one embodiment, the data repository 112 stores a source reviews corpus 118 containing reviews expressing sentiment about various entities. The reviews are typically textual and unstructured in the sense that the reviews do not necessarily provide numeric or other concrete ratings for different aspects of the entities under review.

The source reviews in the corpus 118 include user-provided and/or professional reviews gathered from web sites on the Internet. In one embodiment, each review is associated with a single entity, and this entity is determined based on the way the review is stored by the web site and/or based on a mention within the review. Thus, the source reviews can contain reviews of restaurants gathered from restaurant-specific web sites, reviews of hotels from hotel- and travel-specific web sites, and reviews of consumer electronic devices from technology-specific web sites. While this description focuses on only a few types of entities, e.g., restaurants and hotels, the source reviews can describe a wide variety of entities such as hair salons, schools, museums, retailers, auto shops, golf courses, etc. In some embodiments, the source reviews corpus 118 also includes references to the network locations from which the source reviews were originally obtained.

The data repository 112 includes an aspects database 120 that stores data describing the aspects of the reviewed entities that are summarized by the sentiment summarizer 110. As mentioned above, the aspects in the database 120 can include static and dynamic aspects.

A sentiment summary storage 122 stores the sentiment summaries and related data produced by the sentiment summarizer 110. The sentiment summaries for a given entity include summaries of sentiment for the statically- and dynamically-determined aspects of the entity. In addition, the summaries include sentiment phrases from the source reviews corpus 118 on which the summaries are based. For example, if the entity is a restaurant and the aspect is "service," the sentiment phrases can include "service was quite good" and "truly awful service." Depending upon the embodiment, the sentiment phrases can be stored in the sentiment summary storage 122 or references to the phrases in the source review corpus 118 or on the network 114 can be stored.

The sentiment display engine 116 provides the sentiment summaries stored in the data repository 112 to users, administrators, and other interested parties. In one embodiment, the sentiment display engine 116 is associated with a search engine that receives queries about entities local to geographic regions. For example, the search engine can receive a query seeking information about Japanese restaurants in New York, N.Y. or about hotels in San Francisco, Calif. The search engine provides the query and/or related information (such as a list of entities satisfying the query) to the sentiment display engine 116, and the sentiment display engine provides summaries of aspects of matching entities in return. Thus, if the query is for Japanese restaurants in New York, the sentiment display engine 116 returns summaries of aspects of Japanese restaurants in the New York area. The summaries can include a star rating for each aspect, as well as relevant snippets of review text on which the summaries are based.

The network 114 represents the communication pathways among the sentiment summarizer 110, data repository 112, sentiment display engine 116 and any other systems connected to the network. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 114 can be represented using technologies and/or formats including the HTML, the extensible markup language (XML), the Extensible Hypertext markup Language (XHTML), the compact HTML (cHTML), etc. In addition, all or some of links can be encrypted using conventional encryption technologies such as the secure sockets layer (SSL), HTTP over SSL (HTTPS), and/or virtual private networks (VPNs). Other embodiments use custom and/or dedicated data communications technologies instead of, or in addition to, the ones described above.

II. System Architecture

Figure 2:
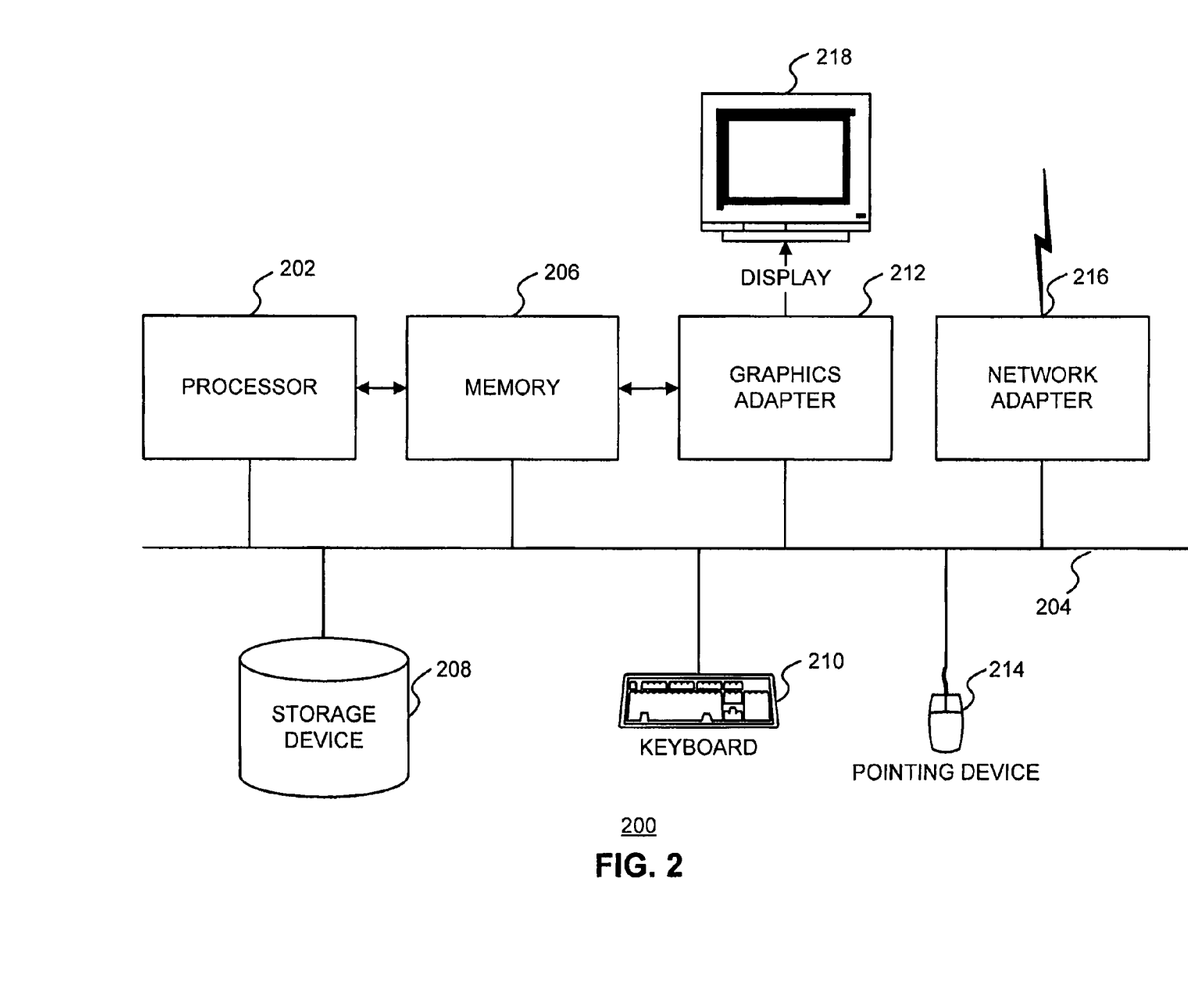
FIG. 2 is a high-level block diagram illustrating a functional view of a typical computer for use as the sentiment summarizer, data repository, and/or sentiment display engine illustrated in the environment of FIG. 1 according to one embodiment.

FIG. 2 is a high-level block diagram illustrating a functional view of a typical computer 200 for use as the sentiment summarizer 110, data repository 112, and/or sentiment display engine 116 illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers used by the entities of FIG. 1 can vary depending upon the embodiment and the processing power required by the entity. The sentiment summarizer 110 and sentiment display engine 116 can each include one or more distributed physical or logical computers operating together to provide the functionalities described herein. Likewise, the data repository 112 can be provided by a storage area network (SAN), database management system (DBMS), or another storage system. The computers can lack some of the components described above, such as keyboards 210, graphics adapters 212, and displays 218.

Figure 3:
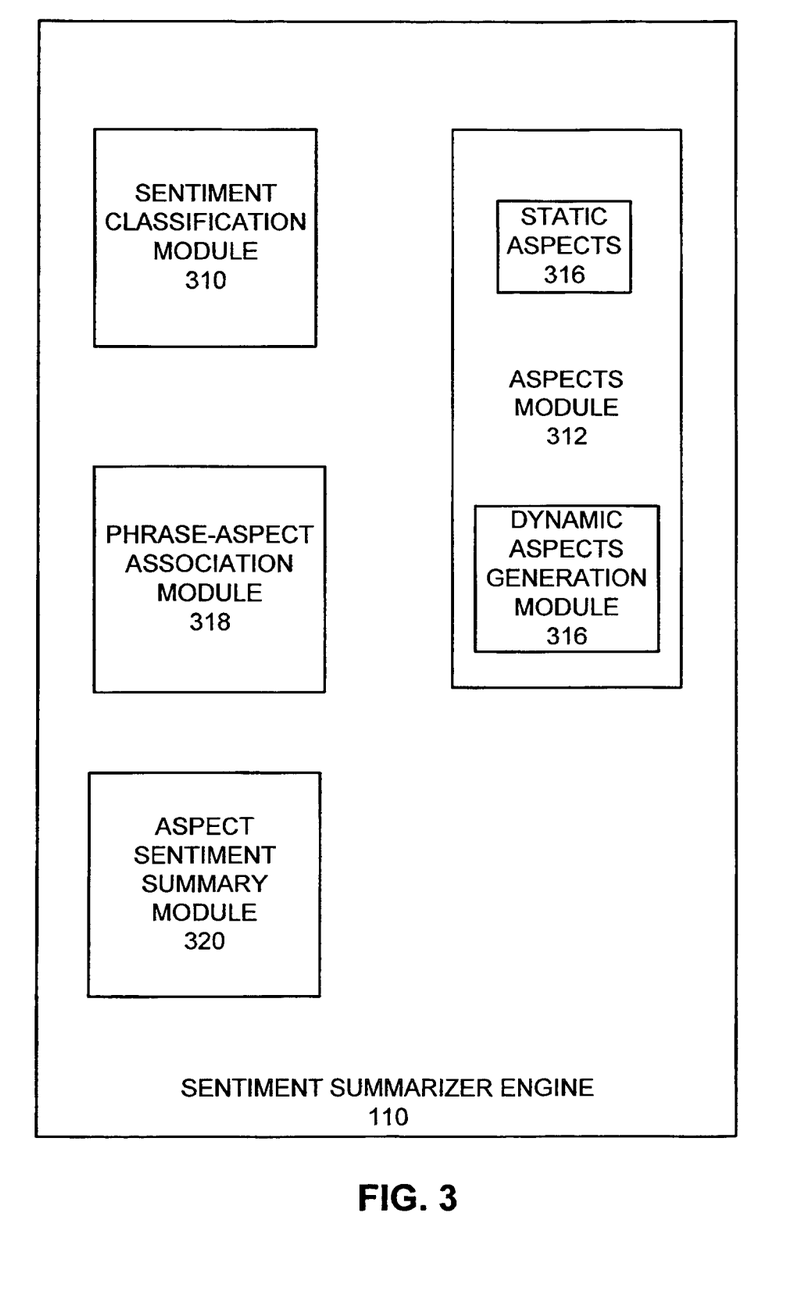
FIG. 3 is a high-level block diagram illustrating modules within the sentiment summarizer according to one embodiment.

FIG. 3 is a high-level block diagram illustrating modules within the sentiment summarizer 10 according to one embodiment. Other embodiments have different and/or additional modules than the ones shown in FIG. 3. Moreover, other embodiments distribute the functions among the modules in different manners.

A sentiment classification module (the "sentiment classifier") 310 analyzes the reviews in the source review corpus 118 to find a set of syntactically coherent phrases which express sentiment about an entity being reviewed. A sentiment phrase can be a partial sentence, a complete sentence, or even more than a sentence. For example, phrases extracted from reviews of an electronic device can include "very good sound quality," "This is my favorite pizzeria ever!!," and "Print quality was good even on ordinary paper."

Each review in the corpus 118 includes a body of text. In order to extract the syntactically coherent phrases, the sentiment classifier 310 tokenizes the text of the reviews to produce a set of tokens. Each token is subject to part-of-speech (POS) tagging in order to associate the proper part of speech with the token. In one embodiment, the sentiment classifier 310 tags the tokens using a probabilistic tagger and the following notation:

Q is used to denote tokens representing punctuation or phrase-breaking markers.
P is used to denote tokens representing pronouns other than "you."
Y is used to denote tokens representing the pronoun "you."
M is used to denote tokens representing modal verbs (e.g., "can").
A is used to denote tokens representing adjectives.
R is used to denote tokens representing adverbs.
N is used to denote tokens representing nouns.
V is used to denote tokens representing verbs.
O is used to denote tokens representing parts-of-speech that are other than the above listed parts-of-speech or unknown.

In some embodiments, the sentiment classifier 310 also processes the tokens comprising the reviews using a variety of natural language processing (NLP) techniques such as stemming, word sense disambiguation and compound recognition.

The sentiment classifier 310 uses a set of regular expression to extract sentiment phrases from the POS-tagged tokens in the reviews. The following regular expressions are given in standard regular expression notation. In this notation, the second set of parentheses represents an example of the text that is extracted.

1. Adjective+Noun: "(.*?)(A+N+)( )" (e.g. great pizza)
2. Adverb+Adjective+Noun: "(.*?)(R+A+N+)( )" (e.g. really great pizza)
3. Model Verb+Verb+Adjective+Noun: "(.*?)(MV ?A+N+)( )" (e.g. can make a great pizza)
4. Pronoun+Verb+Adverb (optional)+Adjective+Noun: "(.*?)(PV ?R*A+N+)( )" (e.g. I love the really great pizza)
5. Punctuation+Verb+Adverb (optional)+Adjective+Noun, if preceded by punctuation: "(^|.*?Q)(V+?R*A+N+)( )" (e.g. Love the great pizza)
6. Noun/Pronoun+Verb+Adverb (optional)+Adjective: "(.*?)((?: N+|P)+V+R*A+)(Q|$)" (e.g. the pizza is really great)

In alternate embodiments, other methods of identifying sentiment phrases are used, such as syntax trees or semantic grammars.

The sentiment classifier 310 generates sentiment scores representing the polarity and magnitude of sentiment expressed by each of the extracted sentiment phrases. The sentiment classifier 310 uses a lexicon-based classifier to perform the scoring. In one embodiment, the lexicon-based classifier is domain-independent and uses a sentiment lexicon derived from a lexical database, such as the electronic lexical database available from Princeton University of Princeton, N.J. An administrator selects initial n-grams for the sentiment lexicon by reviewing the lexical database and manually selecting and scoring seed n-grams (typically single words) expressing high sentiment of positive or negative magnitude. This seed set of n-grams is expanded through an automated process to include synonyms and antonyms referenced in the lexical database. An n-gram not in the seed set receives a sentiment score based on the scores of n-grams with which it bears a relationship.

In one embodiment, the sentiment lexicon is expanded by propagating scores from the seed set to other n-grams using a directed, edge-weighted semantic graph where neighboring nodes are synonyms or antonyms. N-grams in the graph that are positively adjacent to a large number of neighbors with similar sentiment get a boost in score. Thus, a word that is not a seed word, but is a neighbor to at least one seed word, will obtain a sentiment score similar to that of its adjacent seed words. This score propagates out to other n-grams. In one embodiment, the administrator also supplies a set of neutral sentiment n-grams that are used to stop the propagation of sentiment. For example, the neutral word "condition" may be a synonym of both "quality," a generally positive word, and "disease" (as in "a medical condition"), a generally negative word.

The sentiment classifier 310 uses the lexicon-based classifier to score the sentiment expressed by the sentiment phrases based on the n-grams within the phrases. Embodiments of the lexicon-based classifier score the sentiment expressed by a sentiment phase using techniques/factors including: the scores of n-grams in the lexicon found within the sentiment phrase; stemming (i.e., determining the roots of an n-gram in the sentiment phrase in order to match it with an n-gram in the lexicon); POS tagging (i.e., the POS of an n-gram within the sentiment phrase); negation detection; the n-gram based scores of any sentiment phrases found nearby in the document containing the sentiment phrase; and the user-supplied document level label (e.g., "5 stars") for the document containing the sentiment phrase, if any. In one embodiment, the sentiment score for each phrase is normalized to within a pre-established range. For example, the sentiment scores can range from −1 for very negative sentiment to +1 for very positive sentiment. In one embodiment, the sentiment classifier 310 performs domain-specific (i.e., entity type-specific) sentiment classification instead of, or in addition to, the domain-independent sentiment classification described above.

An aspect module 312 identifies the aspects (also known as "features") that are relevant to the entity being reviewed. The aspects can include static aspects that are specific to the type (domain) of the entity, and also dynamic aspects that are specific to the entity itself. Static aspects tend to be coarse-grained aspects (e.g., "food" instead of "fries") that are common to all entities of the given type. Dynamic aspects tend to be fine-grained (e.g., "pizza" for a pizzeria). In one embodiment, the aspects module 312 stores the static and dynamic aspects in the aspects database 120 in the data repository 112. Additionally, in one embodiment the aspects are added to a search index to allow a user to search for an individual aspect. For example, if an aspect is "hamburger," the aspect is added to the index to allow searching for entities having the "hamburger" aspect.

A static aspects module 314 is used to identify the static aspects. In one embodiment, the static aspects are hand-selected. Generally, an administrator or other person identifies entity types of interest and selects aspects of interest for those entity types. The administrator can select aspects based on characteristics including the types of reviews and how the services provided by entities of the given type are used. The static aspects can also be identified by automatically culling the aspects from a large set of reviews for many entities of the same entity type, e.g. by finding the aspects mentioned most frequently in sentiment phrases across all restaurant reviews in the source reviews corpus 118. In one embodiment, the entity types of interest are selected from among the most queried types in queries received by a search engine. As mentioned above, two commonly-searched entity types are restaurants and hotels. Selected static aspects for restaurants in one embodiment include food, décor, service, and value. Static aspects selected for hotels include rooms, location, dining, service, and value. Other types of entities have different static aspects.

A dynamic aspects module 316 identifies the dynamic aspects for one or more entities. Aspects are dynamic in the sense that they are identified from the text of the source reviews of the entity. Dynamic aspects are especially useful for identifying unique aspects of entities where either the aspect, entity type, or both are too sparse to include as static aspects. For instance, reviewers of a given restaurant might rave about the "fish tacos," and the dynamic aspects module 316 will identify "fish tacos" as an aspect.

In one embodiment, dynamic aspects for an entity are determined by identifying the set of source reviews for the entity in the corpus 118. The dynamic aspects module 316 identifies short strings which appear with a high frequency in opinion statements in the reviews. Then, the dynamic aspects module 316 filters the strings in order to produce the set of dynamic aspects.

To identify the short strings, an embodiment of the dynamic aspects module 316 identifies strings of one to three words (i.e., unigrams, bigrams, and trigrams) that appear in the reviews (e.g., "fish tacos"). In one embodiment, the dynamic aspects module 316 employs the POS tagging and regular expression matching described above to identify strings containing nouns or noun compounds which represent possible opinion statements. In particular, the expression that identifies noun sequences following an adjective (e.g., "great fish tacos") is beneficially used to identify strings containing candidate dynamic aspects.

The dynamic aspects module 316 filters the identified strings to remove strings composed of stop words and other strings that appear with a high frequency in the source reviews corpus 118. The module 316 also filters out candidates which occur with low relative frequency within the set of input reviews. The dynamic aspects module 316 uses the sentiment lexicon to sum the overall weight of sentiment-bearing terms that appear in the strings containing candidate dynamic aspects, and filters out aspects which do not have sufficient mentions alongside known sentiment-bearing words. In addition, the module 316 collapses aspects at the word stem level, and ranks the aspects by a manually-tuned weighted sum of their frequency in the sentiment-bearing phrases described above. The higher ranked aspects are the dynamic aspects.

A phrase-aspect association module 318 (the "association module") associates the syntactically coherent sentiment phrases identified by the sentiment classifier 310 with the aspects identified by the aspect module 312. At the high-level, each aspect of an entity represents a possible "bucket" into which sentiment phrases from reviews of the entity may be classified. The association module 318 classifies each sentiment phrase into one or more of the buckets. In one embodiment, a phrase that is not classified into at least one of the static or dynamic aspects is classified within a catch-all "general comments" aspect.

The association module 318 can use classifier-based techniques to associate the sentiment phrases with the aspects. In one embodiment, a classifier is created by identifying a random set of phrases from a given domain (e.g., restaurant reviews) and labeling the phrases with the corresponding aspects that were mentioned. In one embodiment, the set of phrases contains 1500 phrases which are manually labeled with one or more of the aspects. These labeled phrases are used to train a binary maximum entropy classifier for each aspect that predicts whether a phrase mentions that aspect. Some embodiments use additional techniques, such as active learning and semi-supervised learning to improve the classifications. In addition, some embodiments merge training sets for aspects that span multiple domains (e.g., "service" and "value" for restaurants and hotels) in order to further improve classification. In one embodiment, the association module 318 uses the classifier-based techniques for only the static aspects.

In addition, the association module 318 can use string matching techniques to associate the sentiment phrases with the aspects. A phrase is associated with an aspect if the phrase mentions that aspect. In one embodiment, the association module 318 uses natural language processing techniques to enhance the mappings between the n-grams in the sentiment phrases and the aspects. For example, the association module 318 can use stemming and synonym mapping to match the n-grams with the aspects.

An aspect sentiment summary module (the "summary module") 320 summarizes the sentiment for aspects of an entity based on the sentiment phrases associated with the aspects. In one embodiment, the summary module 320 scores the sentiment expressed by each individual phrase assigned to an aspect using the techniques described above with respect to the domain-specific classifier. The summary module 320 uses the mean of the sentiment scores for the phrases as the summary sentiment score for the aspect. The module 320 maps the summary sentiment score to a rating (e.g., n out of 5 stars) for that aspect. In one embodiment, the scores and/or ratings are stored within the sentiment summary storage 122 in the data repository 112.

Figure 4:
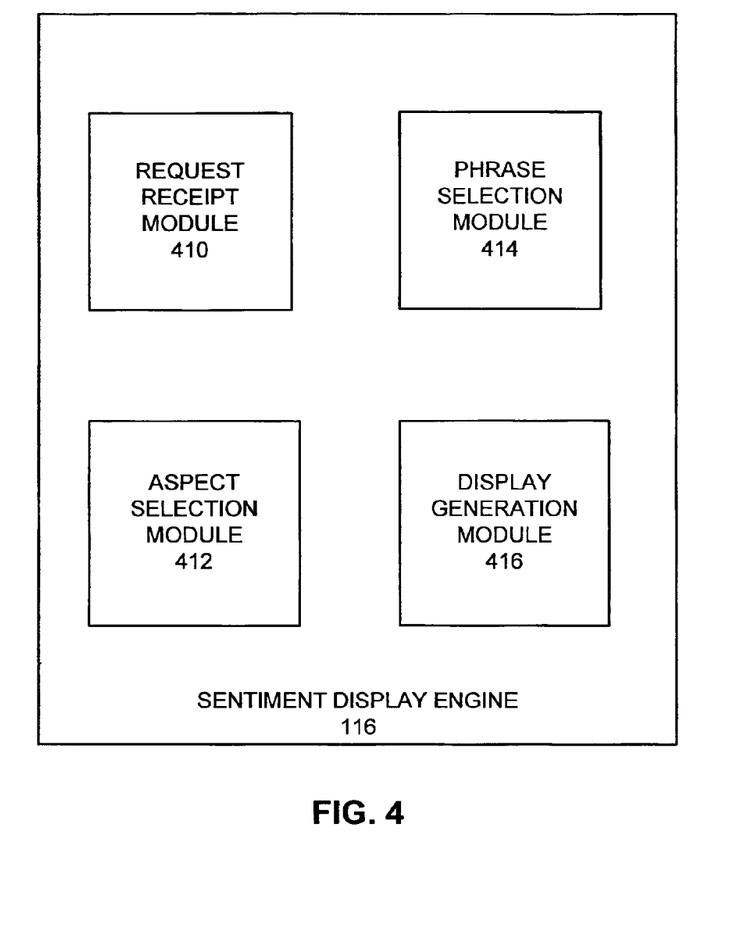
FIG. 4 is a high-level block diagram illustrating modules within the sentiment display engine according to one embodiment.

FIG. 4 is a high-level block diagram illustrating modules within the sentiment display engine 116 according to one embodiment. Other embodiments have different and/or additional modules than the ones shown in FIG. 4. Moreover, other embodiments distribute the functions among the modules in different manners.

A request receipt module 410 receives a request to display sentiment associated with aspects of an entity. As described above, the request can be received in response to a search query issued by a user. An aspect selection module 412 selects the aspects to display in association with the entity. Generally, an entity has more aspects than it is desirable to display at once. Accordingly, the aspect selection module 412 selects the aspects that are most relevant to display in view of the request. In one embodiment, the aspect selection module 412 always selects the static aspects of an entity for display. For dynamic aspects, the module 412 selects the aspects based on the number of sentiment phrases from unique sources (e.g., from different user reviews of the entity). Aspects with phrases from more sources are favored. Thus, an aspect that has sentiment phrases from lots of different reviewers is selected ahead of an aspect that has many sentiment phrases from only a few reviewers. The aspect selection module 412 can also select aspects based on other factors, such as whether the aspect appears as a term within the search query.

A phrase selection module 414 selects sentiment phrases to display in association with an aspect selected by the aspect selection module 412. In most cases there are more phrases associated with an aspect than it is desirable to display at once. The phrase selection module 414 selects a set of representative sentiment phrases for display. For example, if 90% of the sentiment phrases for an aspect are positive and 10% are negative, and there is room to display 10 phrases, the phrase selection module 414 selects nine positive phrases and one negative phrase. In one embodiment, the phrase selection module 414 analyzes the sentiment phrases and selects phrases that are not redundant in view of other selected phrases. Some embodiments of the phrase selection module 414 use other criteria when selecting phrases. For example, in some situations it is desirable to show phrases that are associated with multiple aspects and the phrase selection module 414 thus favors phrases that relate to more than one aspect.

A display generation module 416 generates a display illustrating the selected aspects and phrases for an entity. In one embodiment, the display generation function is performed by a separate module, and the display generation module 416 within the sentiment display engine 116 provides the selected aspects and phrases to the other module.

III. Process

Figure 5:
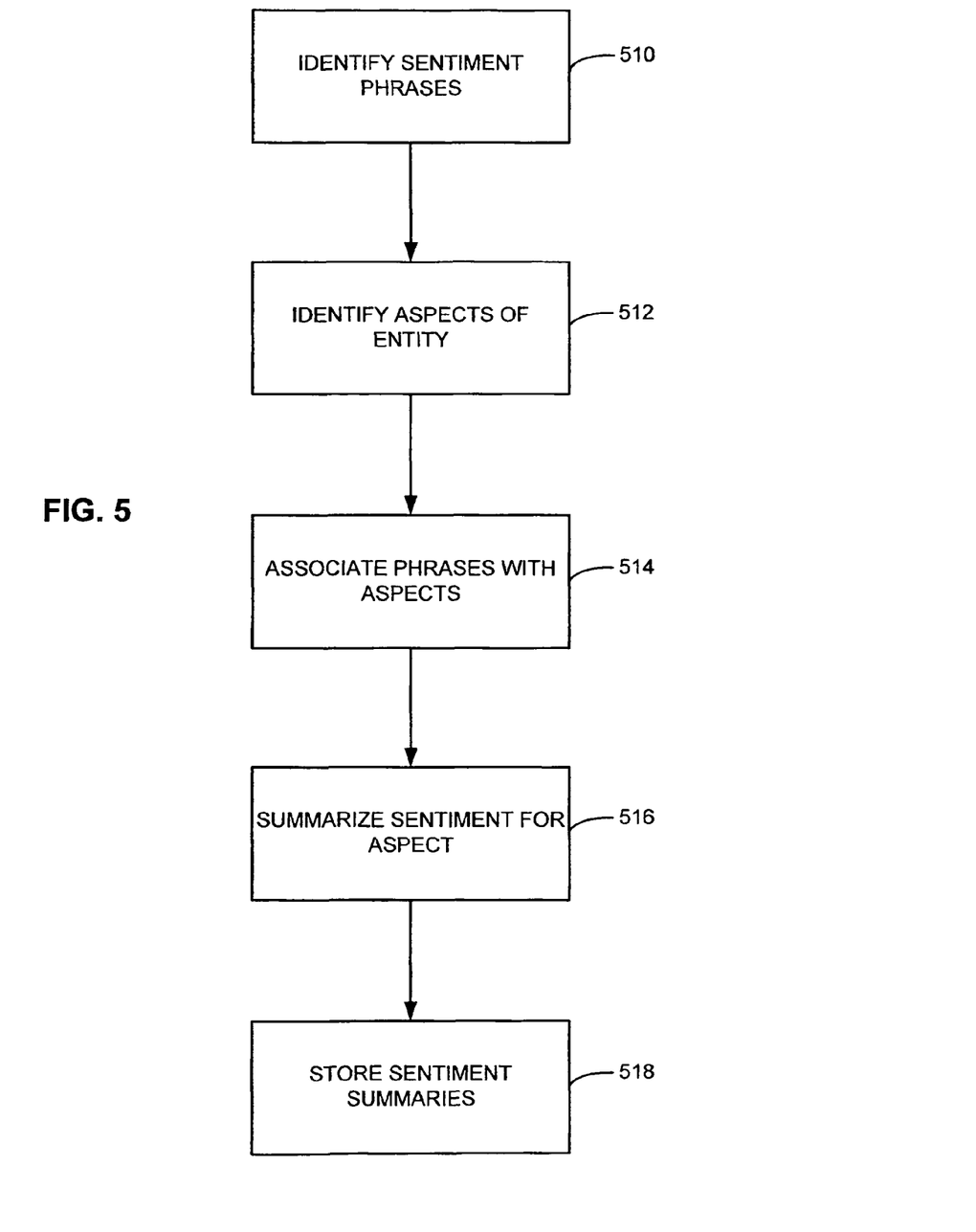
FIG. 5 is a flowchart illustrating steps performed by the sentiment summarizer to summarize sentiment for aspects of an entity according to one embodiment.

FIG. 5 is a flowchart illustrating steps performed by the sentiment summarizer 110 to summarize sentiment for aspects of an entity according to one embodiment. Other embodiments perform additional and/or different steps that the ones described in the figure. In addition, other embodiments perform the steps in different orders and/or perform multiple steps concurrently.

The sentiment summarizer 110 identifies 510 a set of syntactically coherent phrases in source reviews which express sentiment about an entity. The sentiment summarizer 110 also identifies 512 reviewable aspects of the entity, including static and dynamic aspects, and associates 514 the sentiment phrases with the aspects. The sentiment summarizer 110 summarizes 514 the sentiment for each aspect expressed by the aspect's associated phrases. The summary can take the form of a score that is mapped to a rating such as a number of stars. The sentiment summarizer 110 stores the summaries.

Figure 6:
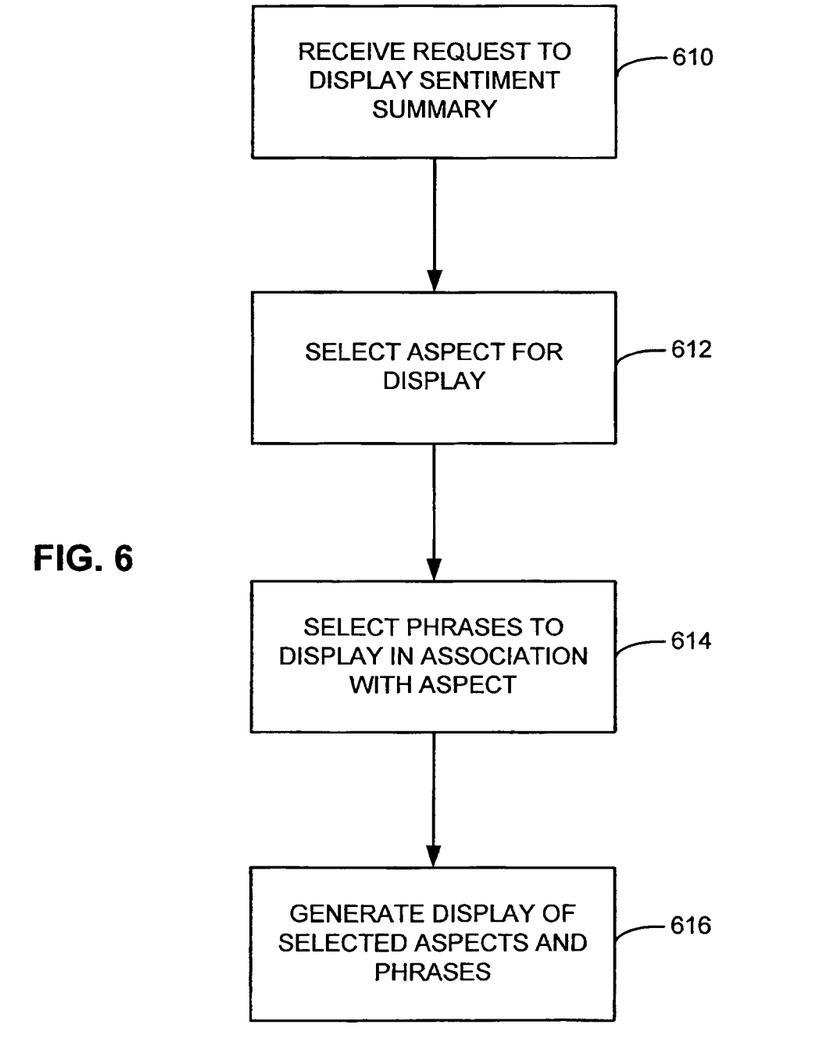
FIG. 6 is a flowchart illustrating steps performed by the sentiment display engine to provide sentiment summaries according to one embodiment.

FIG. 6 is a flowchart illustrating steps performed by the sentiment display engine 116 to provide sentiment summaries according to one embodiment. Other embodiments perform additional and/or different steps that the ones described in the figure. In addition, other embodiments perform the steps in different orders and/or perform multiple steps concurrently.

The sentiment display engine 116 receives 610 a request to display a sentiment summary for an entity. The engine 116 selects 612 the aspects to display based, for example, on the number of unique sources that provided sentiment phrases for the aspects and/or the terms in a search query associated with the request. In addition, the sentiment display engine 116 selects 614 a representative sample of sentiment phrases to display for the selected aspects. The sentiment display engine 116 generates 616 a display of the selected aspects and phrases.

FIG. 7 is a screenshot illustrating a display 700 of the selected aspects and sentiment phrases according to one embodiment. This display can be provided as a web page provided by a web site in response to a query. Different embodiments can provide different displays, and FIG. 7 is merely an example of one such display.

The display 700 includes a portion 712 displaying the name of the entity being reviewed, which in this example is a restaurant named "Enoteca Pizza." This portion also includes related information, such as the address and phone number of the entity, and a map showing the location of the entity. The display includes a set of hypertext links 714 that function as radio buttons and allow a viewer to select additional information about the entity for display. In this case, the "Reviews" link is selected.

The display 700 also includes a portion 710 including columns respectively showing the selected aspects 716, associated ratings 718, and selected sentiment phrases 720 for the entity. A given row of this portion contains a single aspect, a rating for that aspect, and sentiment phrases expressing sentiment about the aspect. For example, row 724 names the aspect "wine," contains a star rating 726 representing a summary of the sentiment for the wine aspect, and contains a representative sample of sentiment phrases 728 describing the wine at the restaurant. Note that the selected aspects shown in the display include static aspects (e.g., "food" and "service") and dynamic aspects (e.g., "pizza," "wine," and "gelato"). In this display 700, the sentiment phrases themselves are clickable links that can be selected to show the underlying review from which the phrases were selected.

Some embodiments of the display 700 do not explicitly show the aspects. For example, the display 700 can show a collection of sentiment phrases culled from a variety of aspects without explicitly showing the aspect with which each phrase is associated. Such a display is useful in situations where it is desirable to produce a compact display of the sentiment phrases, such as when the display is being provided to a mobile telephone with a small display.

Figure 8:
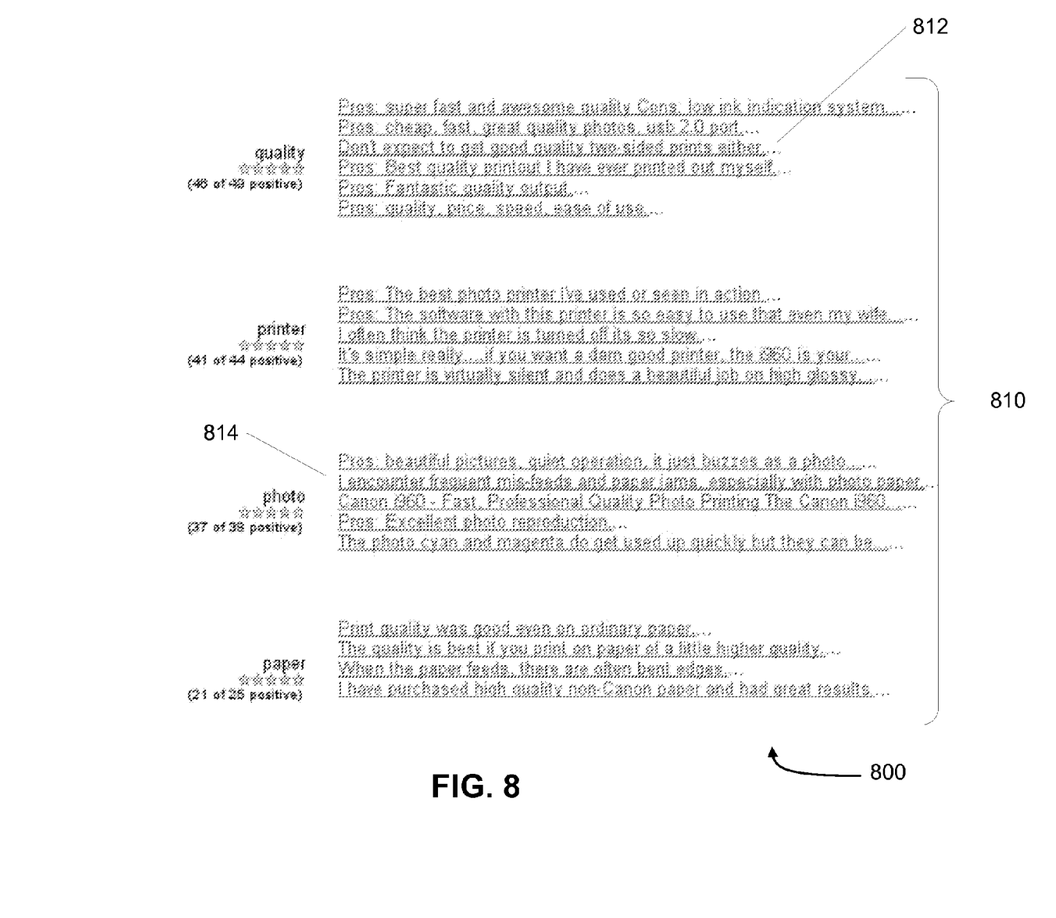
FIG. 8 is a partial screenshot illustrating a display of selected aspects and sentiment phrases according to one embodiment.

FIG. 8 is a partial screenshot illustrating a display 800 of selected aspects and sentiment phrases according to one embodiment. The display 800 of FIG. 8 generally corresponds to the portion 710 of FIG. 7 showing the selected aspects 716, associated ratings 718, and selected sentiment phrases 720 for an entity. FIG. 8 displays aspects, ratings, and sentiment phrases associated with a color printer. The displayed aspects include "quality," "printer," "photo," and "paper."

FIG. 8 is distinctive in that the illustrated sentiment phrases are primarily sentences, rather than partial sentence phrases. For example, one sentiment phrase 812 associated with the "quality" aspect is "Don't expect to get good quality two-sided prints either . . . " Another sentiment phrase 814 associated with the "photo" aspect is "I encounter frequent misfeeds and paper jams, especially with photo paper . . . " Some of the sentences of the illustrated sentiment phrases are truncated in order to fit in the display 800. Other embodiments can display the full text of all or some of the sentences forming the sentiment phrases.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of summarizing sentiment expressed by reviews of an entity, comprising:
    identifying sentiment phrases in the reviews expressing sentiment about the entity;
    identifying reviewable aspects of the entity, wherein identifying reviewable aspects of the entity includes identifying one or more static aspects of the entity based on a type of the entity and identifying one or more dynamic aspects of the entity based on text of one or more of the reviews;
    associating the sentiment phrases with the reviewable aspects of the entity to which the sentiment phrases pertain;
    summarizing the sentiment expressed by the sentiment phrases associated with the reviewable aspects of the entity;
    receiving a request for the summarized sentiment for the entity;
    selecting one or more reviewable aspects of the entity, the selected reviewable aspects a subset of the identified reviewable aspects and being selected to identify the more relevant of the identified reviewable aspects;
    wherein the selecting the one or more reviewable aspects of the entity includes selecting from the static aspects based on first criteria and selecting from the dynamic aspects based on second criteria, the second criteria unique from the first criteria;
    wherein a given reviewable aspect of the selected reviewable aspects is selected based at least in part on how many unique user opinion sources provided the sentiment phrases associated with the given reviewable aspect; and
    storing the selected reviewable aspects in response to the received request.

2. The method of claim 1, wherein identifying sentiment phrases in the reviews expressing sentiment about the entity comprises:
    identifying syntactically coherent phrases in the reviews of the entity; and
    generating sentiment scores for the syntactically coherent phrases, a sentiment score for a phrase representing a polarity and magnitude of sentiment expressed by the phrase.

3. The method of claim 1, wherein identifying reviewable aspects of the entity comprises:
    identifying an entity type associated with the entity; and
    identifying a set of reviewable aspects of the entity responsive at least in part to the entity type.

4. The method of claim 1, wherein identifying reviewable aspects of the entity comprises:
    identifying n-grams appearing with a high-frequency in the reviews of the entity; and
    filtering the identified n-grams to produce a set of reviewable aspects for the entity.

5. The method of claim 1, wherein associating the sentiment phrases with the reviewable aspects of the entity to which the sentiment phrases pertain comprises:
    using a classifier to classify the sentiment phrases with the reviewable aspects of the entity to which the sentiment phrases pertain.

6. The method of claim 5, wherein using the classifier comprises:
    selecting a set of random phrases expressing sentiment;
    labeling the phrases in the random set to identify the reviewable aspects of the entity to which the phrases in the random set pertain;
    using the labeled phrases to train the classifier to predict the reviewable aspects of the entity to which the sentiment phrases pertain.

7. The method of claim 1, wherein associating the sentiment phrases with the reviewable aspects of the entity to which the sentiment phrases pertain comprises:
    determining whether a sentiment phrase mentions a reviewable aspect of the entity; and
    associating the sentiment phrase with the reviewable aspect responsive to a positive determination that the sentiment phrase mentions the reviewable aspect of the entity.

8. The method of claim 1, wherein summarizing the sentiment expressed by the sentiment phrases associated with the reviewable aspects of the entity comprises:
    identifying the sentiment phrases associated with a reviewable aspect of the entity;
    scoring the sentiment expressed by each of the sentiment phrases associated with the reviewable aspect of the entity; and
    determining a summary score for the reviewable aspect of the entity responsive at least in part to the scored sentiment expressed by each of the sentiment phrases associated with the reviewable aspect of the entity.

9. The method of claim 8, further comprising: mapping the summary score to a rating for the reviewable aspect of the entity.

10. The method of claim 1, further comprising:
    selecting one or more of the sentiment phrases for display in association with the selected reviewable aspects; and
    generating a display of the selected reviewable aspects and the selected sentiment phrases in response to the received request.

11. The method of claim 10, wherein selecting one or more of the sentiment phrases for display in association with the selected reviewable aspects comprises:
    selecting a subset of sentiment phrases associated with the reviewable aspect that express a representative sample of the sentiment expressed by a full set of sentiment phrases associated with the reviewable aspect.

12. A non-transitory computer-readable storage medium having computer-executable code encoded therein for summarizing sentiment expressed by reviews of an entity, comprising:
    a sentiment classification module configured to identify sentiment phrases in the reviews expressing sentiment about the entity;
    an aspect module configured to identify reviewable aspects of the entity, wherein the aspect module identifies one or more static aspects of the entity based on a type of the entity and identifies one or more dynamic aspects of the entity based on text of one or more of the reviews;
    an association module configured to associate the sentiment phrases with the reviewable aspects of the entity to which the sentiment phrases pertain;
    a summary module configured to summarize the sentiment expressed by the sentiment phrases associated with the reviewable aspects of the entity; and
    a sentiment display engine configured to:
    receive a request for the summarized sentiment for the entity;
    select one or more reviewable aspects of the entity, the selected reviewable aspects a subset of the identified reviewable aspects and being selected to identify the more relevant of the identified reviewable aspects;

wherein the selecting the one or more reviewable aspects of the entity includes selecting from the static aspects based on first criteria and selecting from the dynamic aspects based on second criteria, the second criteria unique from the first criteria;

wherein a given reviewable aspect of the selected reviewable aspects is selected based at least in part on how many unique user opinion sources provided the sentiment phrases associated with the given reviewable aspect; and store the selected reviewable aspects in response to the received request.

13. The computer-readable storage medium of claim 12, wherein identifying reviewable aspects of the entity comprises:

identifying syntactically coherent phrases in the reviews of the entity; and generating sentiment scores for the syntactically coherent phrases, a sentiment score for a phrase representing a polarity and magnitude of sentiment expressed by the phrase.

14. The computer-readable storage medium of claim 12, wherein identifying reviewable aspects of the entity comprises:

identifying an entity type associated with the entity; and identifying a set of reviewable aspects of the entity responsive at least in part to the entity type.

15. The computer-readable storage medium of claim 12, wherein identifying reviewable aspects of the entity comprises:

identifying n-grams appearing with a high-frequency in the reviews of the entity; and filtering the identified n-grams to produce a set of reviewable aspects for the entity.

16. The computer-readable storage medium of claim 12, wherein associating the sentiment phrases with the reviewable aspects of the entity to which the sentiment phrases pertain comprises:

using a classifier to classify the sentiment phrases with the reviewable aspects of the entity to which the sentiment phrases pertain.

17. The computer-readable storage medium of claim 16, wherein using the classifier comprises:

selecting a set of random phrases expressing sentiment;

labeling the phrases in the random set to identify the reviewable aspects of the entity to which the phrases in the random set pertain;

using the labeled phrases to train the classifier to predict the reviewable aspects of the entity to which the sentiment phrases pertain.

18. The computer-readable storage medium of claim 12, wherein associating the sentiment phrases with the reviewable aspects of the entity to which the sentiment phrases pertain comprises:

determining whether a sentiment phrase mentions a reviewable aspect of the entity; and associating the sentiment phrase with the reviewable aspect responsive to a positive determination that the sentiment phrase mentions the reviewable aspect of the entity.

19. The computer-readable storage medium of claim 12, wherein summarizing the sentiment expressed by the sentiment phrases associated with the reviewable aspects of the entity comprises:

identifying the sentiment phrases associated with a reviewable aspect of the entity;

scoring the sentiment expressed by each of the sentiment phrases associated with the reviewable aspect of the entity; and determining a summary score for the reviewable aspect of the entity responsive at least in part to the scored sentiment expressed by each of the sentiment phrases associated with the reviewable aspect of the entity.

20. The computer-readable storage medium of claim 19, wherein the summary module is further configured to map the summary score to a rating for the reviewable aspect of the entity.

21. A computer-implemented system for summarizing sentiment expressed by reviews of an entity, comprising:

a non-transitory readable storage medium having computer-executable code encoded therein, the code comprising:

a sentiment classification module configured to identify sentiment phrases in the reviews expressing sentiment about the entity, wherein the aspect module identifies one or more static aspects of the entity based on a type of the entity and identifies one or more dynamic aspects of the entity based on text of one or more of the reviews;

an aspect module configured to identify reviewable aspects of the entity;

an association module configured to associate the sentiment phrases with the reviewable aspects of the entity to which the sentiment phrases pertain; and a summary module configured to summarize the sentiment expressed by the sentiment phrases associated with the reviewable aspects of the entity; and a sentiment display engine configured to:

receive a request for the summarized sentiment for the entity;

select one or more reviewable aspects of the entity, the selected reviewable aspects a subset of the identified reviewable aspects and being selected to identify the more relevant of the identified reviewable aspects;

wherein the selecting the one or more reviewable aspects of the entity includes selecting from the static aspects based on first criteria and selecting from the dynamic aspects based on second criteria, the second criteria unique from the first criteria; and wherein a given reviewable aspect of the selected reviewable aspects is selected based at least in part on how many unique user opinion sources provided the sentiment phrases associated with the given reviewable aspect; and store the selected reviewable aspects in response to the received request; and a processor configured to execute the code stored in the storage medium.

22. The system of claim 21, wherein identifying reviewable aspects of the entity comprises:

identifying n-grams appearing with a high-frequency in the reviews of the entity; and filtering the identified n-grams to produce a set of reviewable aspects for the entity.

23. The system of claim 21, wherein associating the sentiment phrases with the reviewable aspects of the entity to which the sentiment phrases pertain comprises:

determining whether a sentiment phrase mentions a reviewable aspect of the entity; and associating the sentiment phrase with the reviewable aspect responsive to a positive determination that the sentiment phrase mentions the reviewable aspect of the entity.

24. The system of claim 21, wherein summarizing the sentiment expressed by the sentiment phrases associated with the reviewable aspects of the entity comprises:
   identifying the sentiment phrases associated with a reviewable aspect of the entity;
   scoring the sentiment expressed by each of the sentiment phrases associated with the reviewable aspect of the entity; and
   determining a summary score for the reviewable aspect of the entity responsive at least in part to the scored sentiment expressed by each of the sentiment phrases associated with the reviewable aspect of the entity.

\* \* \* \* \*